United States Patent [19]
Umeda et al.

[11] Patent Number: 5,523,807
[45] Date of Patent: Jun. 4, 1996

[54] PROGRESSIVE MULTIFOCAL LENS

[75] Inventors: Toshiaki Umeda, Tokyo; Yasunori Ueno, Kawasaki; Fumio Takahashi, Ibaraki-ken, all of Japan

[73] Assignee: Nikon Corporation, Tokyo, Japan

[21] Appl. No.: 249,962

[22] Filed: May 27, 1994

[30] Foreign Application Priority Data

May 31, 1993 [JP] Japan .................................. 5-149731

[51] Int. Cl.$^6$ ..................................................... G02C 7/06
[52] U.S. Cl. ........................................................ 351/169
[58] Field of Search ................................... 351/168, 169, 351/170, 171, 172

[56] References Cited

U.S. PATENT DOCUMENTS

| | | | |
|---|---|---|---|
| 5,000,559 | 3/1991 | Takahashi et al. | 351/169 |
| 5,048,945 | 9/1991 | Ueno et al. | 351/169 |

FOREIGN PATENT DOCUMENTS 0048067  1/1991  European Pat. Off. .

OTHER PUBLICATIONS

Guilino, G. H., "Design Philosophy for Progressive Addition Lenses", *Applied Optics*, vol. 32, No. 1, Jan. 1, 1993, pp. 111–117.

*Primary Examiner*—Scott J. Sugarman
*Attorney, Agent, or Firm*—Shapiro and Shapiro

[57] ABSTRACT

In a progressive multifocal lens of the present invention, the horizontal sectional shape of a refracting surface of the lower portion of a farsight portion defines a non-circular arc in which a horizontal section curvature is increased and then decreased away from an intersecting point with the principal meridional curve along a horizontal crossing curve, the horizontal sectional shape of a refracting surface of the upper portion of a nearsight portion defines a non-circular arc in which a horizontal section curvature is decreased and then made approximately constant away from an intersecting point with the meridional curve along a horizontal crossing curve, the gradient of the decrease of a horizontal section curvature is approximately constant from the upper portion of the nearsight portion to the lower portion thereof, the horizontal sectional shape of a refracting surface of the center of an intermediate portion in which a horizontal section curvature is decreased away from an intersecting point with the principal meridional curve along a horizontal crossing curve, and the gradient of the decrease of a horizontal section curvature is increased approaching the nearsight portion from the center of the intermediate portion.

6 Claims, 4 Drawing Sheets

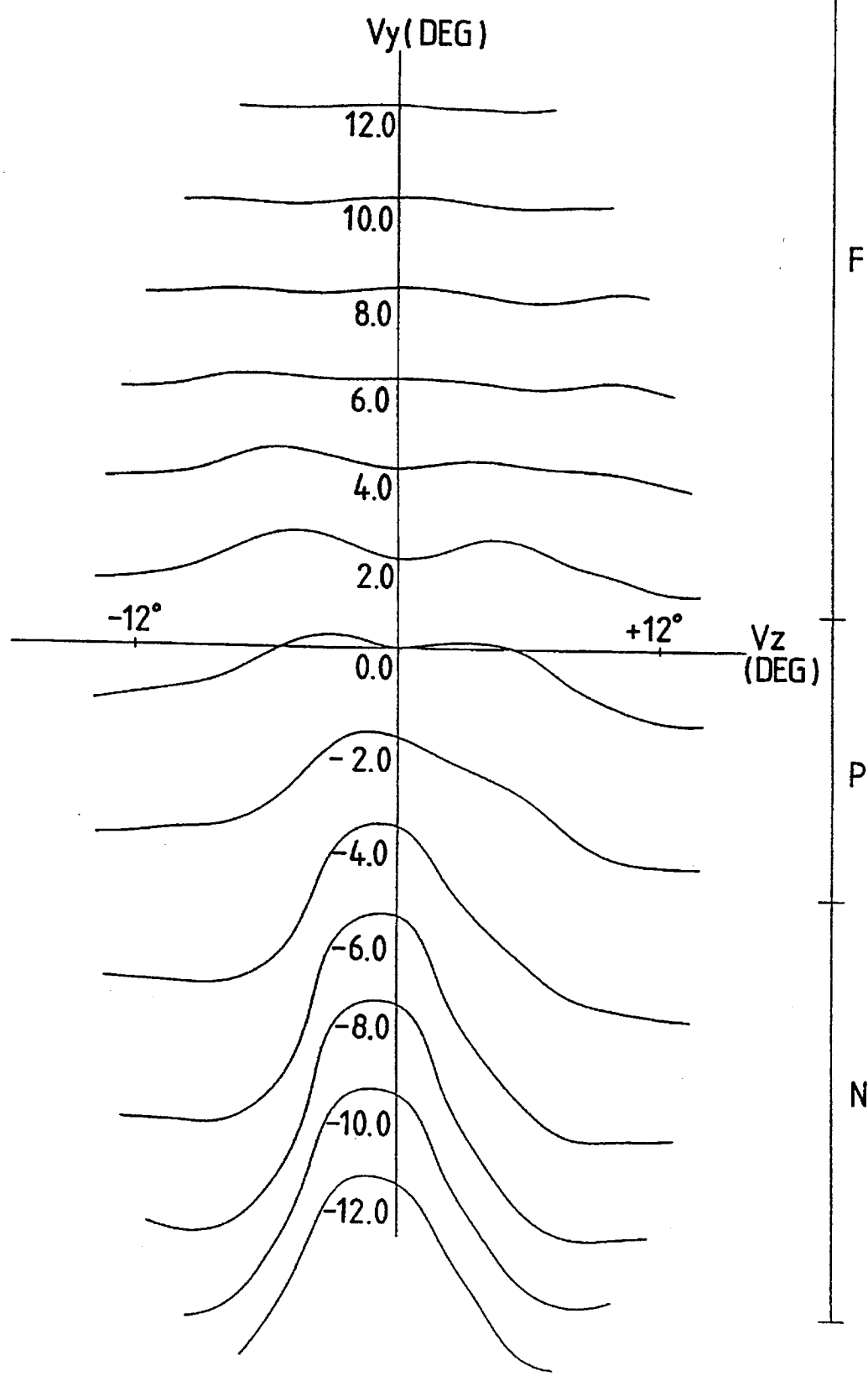

PROGRESSIVE MULTIFOCAL LENS

BACKGROUND OF THE INVENTION

1. Field of the Invention

The present invention relates to a progressive multifocal lens used to assist an accommodation power of an eye.

2. Related Background Art

As spectacle lenses for assisting an accommodation power when an accommodation power of an eye becomes too weak to see a near point, various progressive multifocal lenses have been known. A progressive multifocal lens of this type has a "farsight portion", a "nearsight portion" and a progressive region (referred to as an "intermediate portion" hereinafter) which is located between the above two portions in which a refracting power is continuously changed. When the progressive multifocal lens is actually worn as spectacles by a user, the farsight portion becomes an upper portion while the nearsight portion becomes a lower portion. In the present invention, it is to be noted that "upper portion" "lower portion", "horizontal" and "vertical" are used to point positions of the progressive multifocal lens in the state that it is actually worn by the user. For example, the lower portion of the farsight portion is a position within the farsight portion close to the intermediate portion. Also, the difference between the nearsight refracting power and the farsight refracting power is called an additional power.

In a progressive multifocal lens of this type, in general, when wide distinct vision areas (ranges with an astigmatic difference of 0.5 diopter or less) of the farsight and nearsight portions are kept and coupled by the progressive power range, lens aberrations are concentrated on side regions of the progressive power range. As a result, blurring and distortion of an image occur in these side portions. Therefore, when a user wears spectacles formed of these multifocal lenses and shifts his eyes laterally, he perceives the distortion of an image as the fluctuation of the image and has an unpleasant feeling.

In order to prevent such a problem of visual characteristics, in known progressive multifocal lenses, various designs and evaluations have been made from a variety of viewpoints. As for the shape of a lens surface, an intersecting line (principal meridional curve) defined by a section extending along a vertical meridian vertically passing through substantially the center of a lens surface and an object-side lens surface is used as a reference curve for expressing specifications such as an additional power of a lens, and is also used as an important reference curve in a lens design.

As shown in FIG. 1, a progressive multifocal lens (hereinafter referred to as an asymmetrical progressive multifocal lens) has been proposed in which an intermediate portion P and a nearsight portion N are asymmetrically arranged in consideration of the fact that a nearsight eye point (not shown) of the nearsight portion N is slightly displaced from the center toward a nasal side when the lens is worn. Also, in such an asymmetrical progressive multifocal lens, a center line MM' consisting of an intersecting line of an object-side lens surface and a section passing the center OF of a farsight portion F, a farsight eye point E and the center of the nearsight portion N is used as a reference line. These reference lines will be referred to as "principal meridional curves" in the present invention.

There are conventional progressive multifocal lenses disclosed in, e.g., Japanese Patent Publication Nos. 63-42764 and 2-39768.

In the lens of Japanese Patent Publication No. 63-42764, the distortion of an image in side regions of an intermediate portion is small and the distribution of an astigmatic difference becomes gentle. However, the reduction of a maximum astigmatic difference is not achieved.

In the lens of Japanese Patent Publication No. 2-39768, the width of a distinct vision area is enlarged by lessening the rates of changes of curvatures of horizontal crossing curves in farsight and nearsight portions toward the upper and lower regions of the lens. However, as the result of widening the distinct vision area, the gradient of an astigmatic difference becomes steep especially in the nearsight portion and the reduction of a maximum astigmatic difference is not achieved.

Thus, although the improvement of visual performance can be admitted to a certain extent in the conventional progressive multifocal lenses, it is not sufficient to obtain optimum visual performance in that the reduction of the maximum astigmatic difference is not yet achieved.

SUMMARY OF THE INVENTION

It is an object of the present invention to provide a progressive multifocal lens capable of having wider and stable distinct vision areas of intermediate and nearsight portions and reducing a maximum astigmatic difference while securing a sufficiently wider distinct vision area of a farsight portion for practical use.

In order to achieve the above object, in a progressive multifocal lens comprising, along a principal meridional curve, a farsight portion having a refracting power corresponding to a distant view, a nearsight portion having a refracting power corresponding to a near view, and an intermediate portion, located between the farsight and nearsight portions, for continuously connecting the refracting powers of the farsight and nearsight portions, a horizontal sectional shape of a refracting surface of a lower portion of the farsight portion defines a non-circular arc in which a horizontal section curvature is increased and then decreased away from an intersecting point with the principal meridional curve along a horizontal crossing curve, a horizontal sectional shape of a refracting surface of an upper portion of the nearsight portion defines a non-circular arc in which a horizontal section curvature is decreased and then made approximately constant away from an intersecting point with the meridional curve along a horizontal crossing curve, a gradient of a decrease of a horizontal section curvature is approximately constant from the upper portion of the nearsight portion to a lower portion thereof, a horizontal sectional shape of a refracting surface of a center of the intermediate portion defines a non-circular arc in which a horizontal section curvature is decreased away from an intersecting point with the principal meridional curve along a horizontal crossing curve, and a gradient of a decrease of a horizontal section curvature is increased approaching the nearsight portion from the center of the intermediate portion.

In a preferred embodiment of the present invention, a horizontal sectional shape of a refracting surface from a lower portion of said intermediate portion to the upper portion of said nearsight portion defines a non-circular arc in which a horizontal section curvature is decreased and then made approximately constant away from an intersecting point with said principal meridional curve. Further, preferably, in an asymmetrical progressive multifocal lens wherein a refracting surface is divided asymmetrically by said principal meridional curve into a nasal side portion and a temporal side portion, a gradient of a decrease of a horizontal section curvature is larger in said nasal portion from said intermediate portion to said nearsight portion than in said temporal portion.

According to the progressive multifocal lens of the present invention, the horizontal sectional shape of the refracting surface of the lower portion of the farsight portion F is the non-circular arc such that the horizontal section curvature is increased and then decreased away from the principal meridional curve. Therefore, while obtaining a sufficiently wider distinct vision area around the eye point E of the farsight portion F, the connection between the intermediate portion P and the farsight portion F can be performed smoothly.

Also, the center of the intermediate portion P has the non-circular arc shape in section and the rate of the decrease of the horizontal section curvature is increased approaching the nearsight portion N, so that a distinct vision area can be widened. Further, the upper portion of the nearsight portion N has the non-circular arc shape such that the horizontal section curvature is decreased and then made approximately constant. Therefore, a distinct vision area in the vicinity of a nearsight eye point can be widened and the concentration of an astigmatic difference can be mitigated in side regions.

Further, as the rate of the decrease of the horizontal section curvature is kept approximately constant from the upper portion to the lower portion of the nearsight portion N, it is possible to reduce a maximum astigmatic difference and the gradient of the astigmatic difference can be made gentle.

As a result, while securing a wider distinct vision area as visual performance, the distortion and fluctuation of an image in the side regions can be preferably eliminated, making it possible to eliminate uncomfortable feeling at the time of use as spectacles.

BRIEF DESCRIPTION OF THE DRAWINGS

FIG. 4 is a graph showing the change of the curvature of the refracting surface, specifically the changes of the curvatures of the refracting surface σ in the Z direction along the respective horizontal crossing curves;

DESCRIPTION OF THE PREFERRED EMBODIMENT

An embodiment of the present invention will be described with reference to the accompanying drawings.

Figure 2:
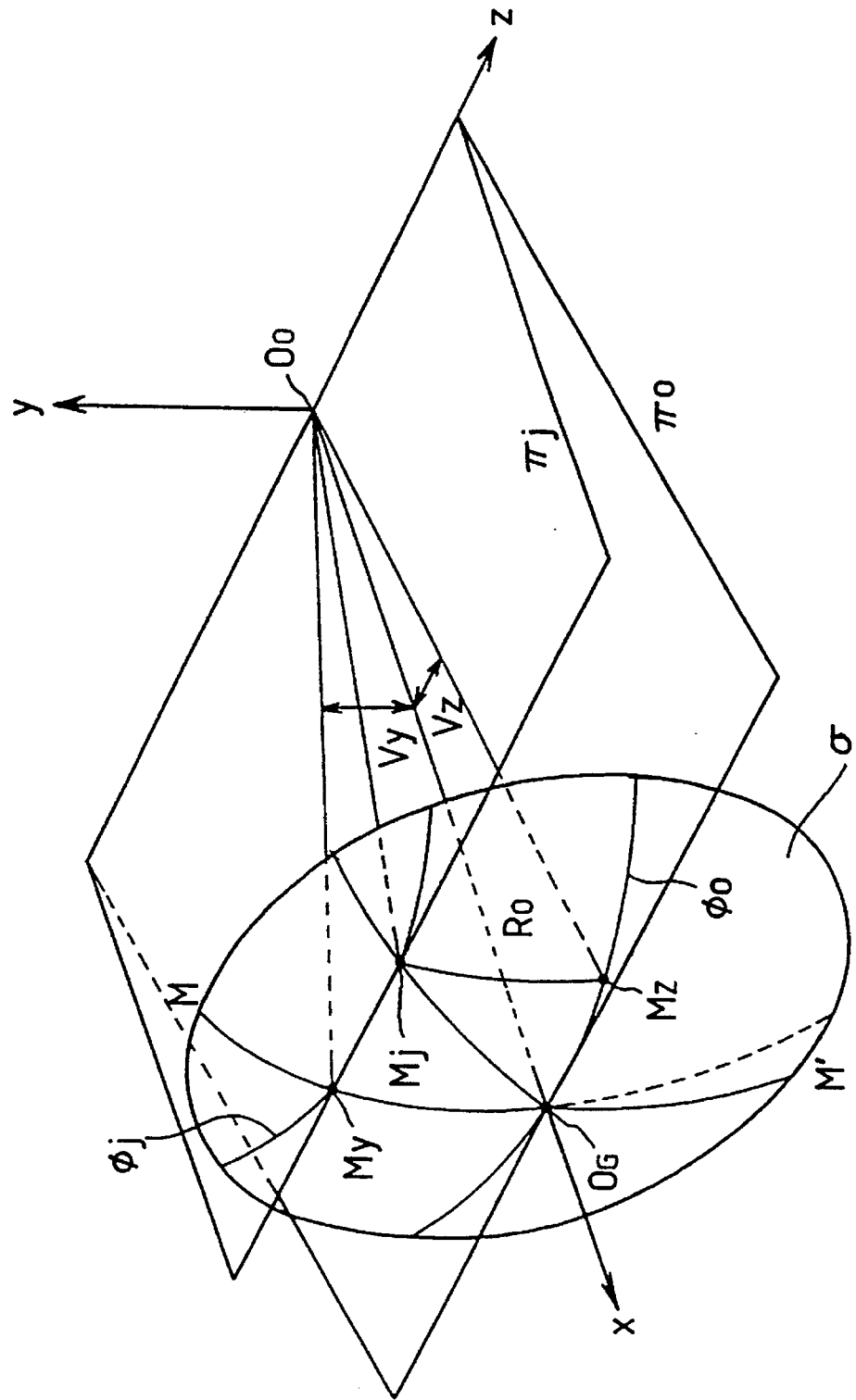
FIG. 2 is a perspective view for explaining a horizontal crossing curve with respect to the refracting surface σ of the lens.

FIG. 2 is a perspective view for explaining a horizontal crossing curve with respect to a refracting surface G of the progressive multifocal lens. The geometric center of the lens is $O_G$ and the center of curvature of the refracting surface a at the geometric center $O_G$ is $O_O$. An axis passing the geometric center $O_G$ and the center $O_O$ of curvature is made as an X-axis. A spherical surface drawn by a radius $R_O$ of curvature of the refracting surface a at the geometric center $O_G$ is made as a reference spherical surface. Therefore, the reference spherical surface is in contact with the refracting surface σ of the lens at the geometric center $O_G$. Y- and Z-axes are respectively plotted in the vertical and horizontal directions with the center $O_O$ of the reference spherical surface as an origin.

In the present invention, a "horizontal crossing curve" represents a traverse curve on the refracting surface σ defined horizontally by a plane πj (j= 0, ±1, ±2, . . . ) passing the center $O_O$ of the reference spherical surface and being perpendicular to an x-y plane. Namely, a "horizontal crossing curve" is an intersecting line of a plane πj and the refracting surface σ and is expressed as a horizontal intersecting line Φj. Also, a section of the lens cut horizontally by a plane πj including a horizontal crossing curve is called a "horizontal section".

Figure 1:
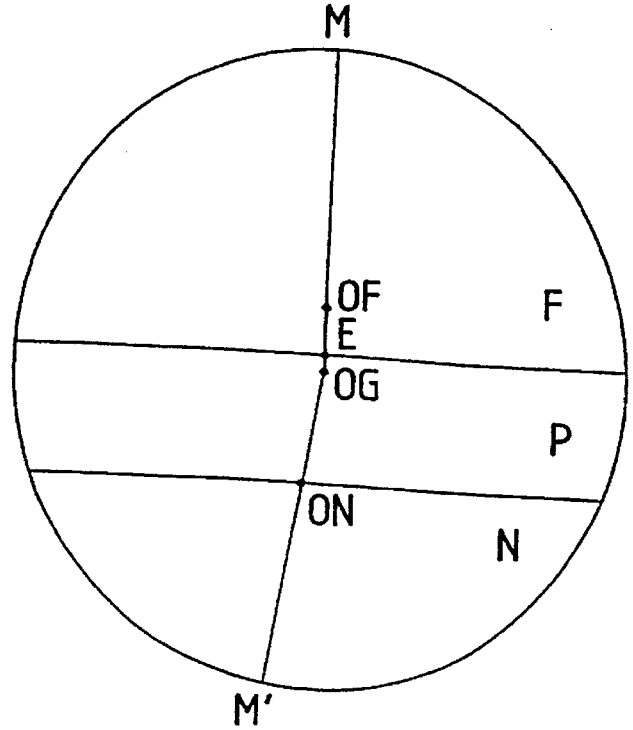
FIG. 1 is a plan view showing divisions of regions of a progressive multifocal lens designed asymmetrically according to the present invention.
Figure 3:
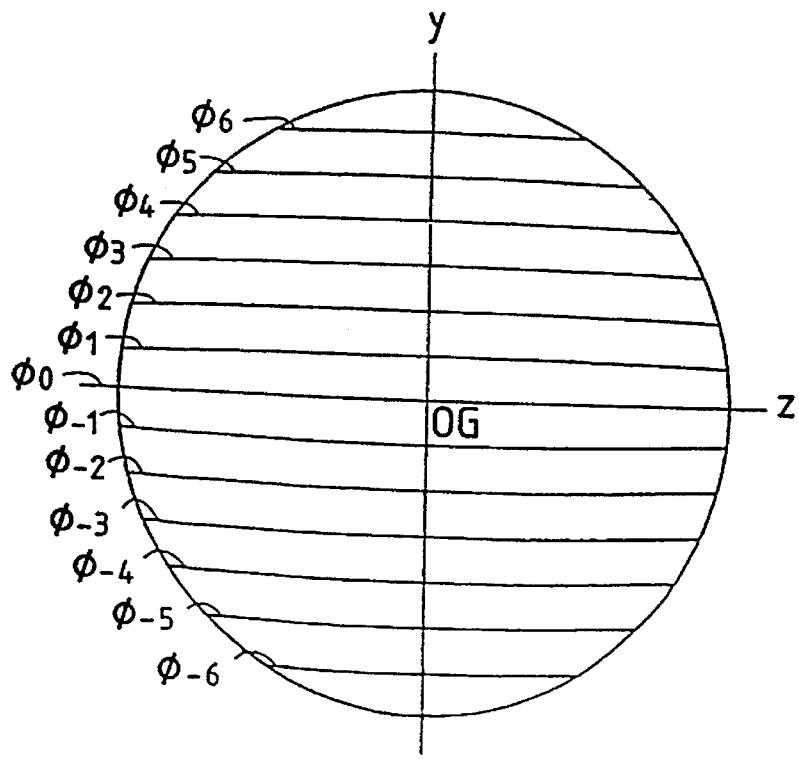
FIG. 3 is a plan view showing the horizontal intersecting line Φj projected to the yz plane of FIG. 2.

FIG. 3 shows the position of horizontal intersecting lines Φj projected to a yz plane of FIG. 2 and, i.e., shows the position of horizontal intersecting lines Φj on the refracting surface of the lens flatly.

FIG. 4 shows the change of the curvature of the refracting surface of the progressive multifocal lens of this embodiment and shows specifically the changes of the curvatures of the refracting surface along the horizontal intersecting lines $Φ_6$–$Φ_{-6}$. In the present invention, curvatures of the refracting surface along the respective horizontal crossing curves are called "horizontal section curvatures".

In FIG. 4, an intersecting point of a plane πj including a point Mj on the refracting surface and an intersecting line of the x-y plane and the refracting surface σ is made as My and an angle Vy formed by the X-axis and a segment connecting the point My and the center $O_O$ of curvature is represented by a vertical axis. On the other hand, a point on the horizontal intersecting line $Φ_O$ having the same Z-axis element as the point Mj on the refracting surface is made as Mz and an angle Vz formed by the X-axis and a segment connecting the point Mz and the center $O_O$ of curvature is represented by a horizontal axis.

FIG. 4 shows changes of horizontal section curvatures of 13 representative horizontal sections intersecting the principal meridional curve MM'. More specifically, in the respective horizontal sections for which the angle Vy is changed by 2° in the range of +12° to −12°, changes of horizontal section curvatures at respective positions for which the angle Vz is changed by 2° in the range of +12° to −12° are represented by changes with respect to respective horizontal section curvatures at intersecting points with the principal meridional curve MM'. That is, in FIG. 4, the angles Vy and Vz are represented respectively by the vertical and horizontal axes. And, in one of those, states where the changes of the horizontal section curvatures at the respective positions are increased with respect to reference horizontal section curvatures are indicated by upward curves. On the other hand, the opposite states are indicated by downward curves.

In this embodiment, the farsight portion F corresponds to the upper range having the angle Vy of about +1° or more while the nearsight portion N corresponds to the lower range having the angle Vy of about −6° or less.

The progressive multifocal lens of this embodiment is the asymmetrical progressive multifocal lens in which the average refracting power (base curve) of the farsight portion F is 3.50 diopter and the additional power is 2.5 diopter. In FIG. 4, the left-hand side corresponds to a nasal side portion and the right-hand side corresponds to a temporal side portion.

As shown in FIG. 4, in the progressive multifocal lens of this embodiment, the horizontal sectional shape of the lower portion (Vy: +4° to +2°) of the farsight portion F is a non-circular arc such that the horizontal section curvatures are increased and then decreased away from the respective intersecting points with the principal meridional curve MM'.

Also, the horizontal sectional shape of the center (Vy: −2°) of the intermediate portion P is a non-circular arc such that the horizontal section curvature is decreased away from the intersecting point with the principal meridional curve MM'.

Further, the upper portion (Vy: −6° to −8°) of the nearsight portion N is a non-circular arc such that the horizontal section curvatures are decreased and then made approximately constant away from the intersecting points with the principal meridional curve MM' and the rates of the horizontal section curvatures are kept approximately constant from the upper portion to the lower portion.

Further, when observing the changes of the horizontal section curvatures along the horizontal sections, the horizontal section curvatures of the side regions of the lower portion of the farsight portion F are increased and decreased respectively within about 10% with respect to the respective horizontal section curvatures at the intersecting points of the corresponding horizontal sections and the principal meridional curve. The horizontal section curvatures of the side regions of the center of the intermediate portion P are decreased within about 40% with respect to the respective horizontal section curvature at the intersecting point of the corresponding horizontal section and the principal meridional curve. Further, the horizontal section curvatures of the side regions of the upper portion of the nearsight portion N are decreased within about 45% with respect to the respective horizontal section curvatures at the intersecting points of the corresponding horizontal sections and the principal meridional curves.

In the temporal side portion (Vz: 0° to +12°), the gradients of the maximum decreases of the horizontal section curvatures from approximately the center (Vy: −2°) of the intermediate portion P to the lower portion (Vy: −12°) of the nearsight portion N are respectively about 5% in the horizontal section having the angle Vy of −2°, about 14% in the horizontal section having the angle Vy of −4%, about 19% in the horizontal section having the angle of −6°, about 20% in the horizontal section having the angle of −8°, about 18% in the horizontal section having the angle of −10° and about 17% in the horizontal section having the angle of −12°. On the other hand, in the nasal side (Vz: 0° to −12°), those are respectively about 12% in the horizontal section having the angle Vy of −2°, about 19% in the horizontal section having the angle Vy of −4°, about 23% in the horizontal section having the angle of −6°, about 24% in the horizontal section having the angle of −8°, about 24% in the horizontal section having the angle of −10° and about 21% in the horizontal section having the angle of −12°.

Thus, although the gradients of the decreases of both side portions are approximately constant in the region from the angle Vy of −6° to the angle of −12°, the gradients of the decreases of the horizontal section curvatures are larger in the nasal side portion than in the temporal side portion.

It is to be noted that the values of the horizontal section curvatures in FIG. 4 correspond to the additional power of 2.5. The lower the dioptric power becomes, the smaller the increase, decrease and the percent value of the gradient of a decrease become. On the other hand, the higher the dioptric power becomes, the larger those values become. However, the trend of the manner of the changes of horizontal section curvatures is not changed.

Figure 5:
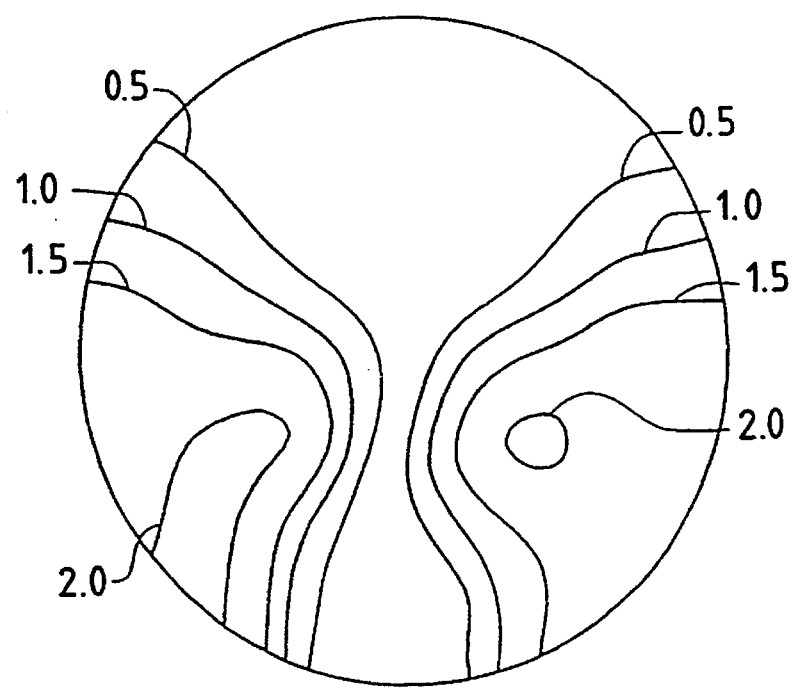
FIG. 5 is a graph showing astigmatic difference curves of the lens.

FIG. 5 is a graph showing astigmatic difference curves of the progressive multifocal lens of this embodiment. The astigmatic difference curves are shown by 0.5 diopter.

Figure 6:
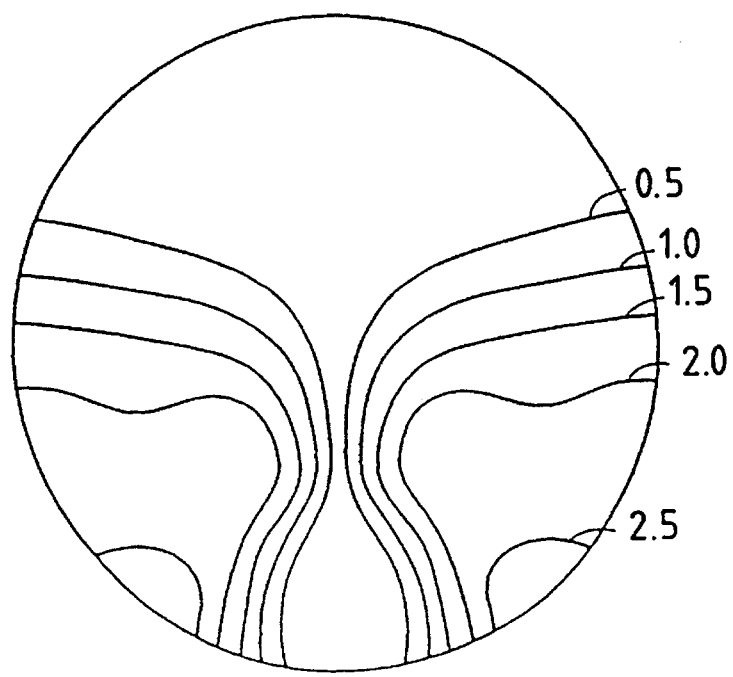
FIG. 6 is a graph showing astigmatic difference curves of a conventional progressive multifocal lens.

For comparison to this embodiment, astigmatic difference curves of a conventional progressive multifocal lens having the additional power of 2.5 are shown by 0.5 diopter in FIG. 6. In this lens, the value of the maximum astigmatic difference is 2.5 diopter and the absolute amount and gradient of the astigmatic difference are steep.

On the other hand, in the progressive multifocal lens, despite the fact that the astigmatic difference is liable to be concentrated especially on the side region of the nasal side portion due to the asymmetrical design, the value of the maximum astigmatic difference is reduced to be 2.0 diopter. Also, by the comparison to the conventional lens, it is known that while securing a sufficiently wider distinct vision area of the farsight portion for practical use, distinct vision areas of the intermediate and nearsight portions can be widened, the density of the astigmatic difference is largely reduced to make the gradient of the astigmatic difference gentle.

As described above, the progressive multifocal lens of the present invention can have the wider and stable distinct vision areas of the intermediate and nearsight portions while securing the sufficiently wider distinct vision area of the farsight portion for practical use. Also, the value of the maximum astigmatic difference is reduced and the density of the astigmatic difference is largely reduced to make the gradient of the astigmatic difference gentle. Therefore, the distortion of an image is lessened and then, even though the user shifts his eyes laterally, he will not feel unpleasant due to the fluctuation of an image in the side regions.

What is claimed is:

1. A progressive multifocal lens comprising, along a principal meridional curve, a farsight portion having a refracting power corresponding to a distant view, a nearsight portion having a refracting power corresponding to a near view, and an intermediate portion, located between said farsight and nearsight portions, for continuously connecting said refracting powers of the farsight and nearsight portions, and wherein a horizontal sectional shape of a refracting surface of a lower portion of said farsight portion defines a non-circular arc in which a horizontal section curvature is increased and then decreased away from an intersecting point with said principal meridional curve along a horizontal crossing curve, a horizontal sectional shape of a refracting surface of an upper portion of said nearsight portion defines a non-circular arc in which a horizontal section curvature is decreased and then made approximately constant away from an intersecting line with said principal meridional curve along a horizontal crossing curve, a gradient of a decrease of a horizontal section curvature is approximately constant from the upper portion of said nearsight portion to a lower portion thereof, a horizontal sectional shape of a refracting surface of a center of said intermediate portion defines a non-circular arc in which a horizontal section curvature is always decreased away from an intersecting point with said principal meridional curve along a horizontal crossing curve, and a gradient of a decrease of a horizontal section curvature is increased approaching said nearsight portion from the center of said intermediate portion.

2. A progressive multifocal lens according to claim 1, wherein a horizontal sectional shape of a refracting surface from a lower portion of said intermediate portion to the upper portion of said nearsight portion defines a non-circular arc in which a horizontal section curvature is decreased and then made approximately constant away from an intersecting point with said principal meridional curve along a horizontal crossing curve.

3. A progressive multifocal lens according to claim 1, wherein said nearsight portion is arranged asymmetrically.

4. A progressive multifocal lens according to claim 3, wherein gradients of decreases of said horizontal section curvatures are larger in a nasal side portion from said intermediate portion to said nearsight portion than in a temporal side portion.

5. A progressive multifocal lens according to claim 2, wherein said nearsight portion is arranged asymmetrically.

6. A progressive multifocal lens according to claim 5, wherein gradients of decreases of said horizontal section curvatures are larger in a nasal side portion from said intermediate portion to said nearsight portion than in a temporal side portion.

* * * * *